(12) United States Patent
Reznichenko et al.

(10) Patent No.: US 6,835,921 B2
(45) Date of Patent: Dec. 28, 2004

(54) FOCUSING SYSTEM FOR USE IN IMAGING SYSTEMS

(75) Inventors: Yakov Reznichenko, Newton, MA (US); Torsten Platz, Cambridge, MA (US)

(73) Assignee: Agfa Corporation, Wilmington, MA (US)

( * ) Notice: Subject to any disclaimer, the term of this patent is extended or adjusted under 35 U.S.C. 154(b) by 105 days.

(21) Appl. No.: 10/269,406

(22) Filed: Oct. 11, 2002

(65) Prior Publication Data

US 2003/0071193 A1 Apr. 17, 2003

Related U.S. Application Data

(63) Continuation-in-part of application No. 09/712,860, filed on Nov. 15, 2000, now Pat. No. 6,504,137.

(51) Int. Cl.[7] .............................................. G02B 7/04
(52) U.S. Cl. .................................. 250/201.2; 250/201.4
(58) Field of Search ......................... 250/201.2–201.5, 250/201.8; 356/4.03, 609, 122, 624; 347/241, 198

(56) References Cited

U.S. PATENT DOCUMENTS

| | | | | |
|---|---|---|---|---|
| 4,530,080 A | * | 7/1985 | Aoi et al. ................. | 369/44.13 |
| 4,798,948 A | * | 1/1989 | Neumann et al. ......... | 250/201.3 |
| 4,804,975 A | | 2/1989 | Yip | |
| 4,844,617 A | * | 7/1989 | Kelderman et al. ........ | 356/624 |
| 4,987,292 A | * | 1/1991 | Howard ................... | 250/201.5 |
| 5,212,500 A | | 5/1993 | Harrigan et al. | |
| 5,500,708 A | * | 3/1996 | Ohsawa ..................... | 396/114 |
| 6,448,995 B1 | * | 9/2002 | Fujimoto et al. ........... | 347/241 |

FOREIGN PATENT DOCUMENTS

GB  1285870  8/1972

* cited by examiner

*Primary Examiner*—Edward J. Glick
*Assistant Examiner*—Hoon Song
(74) *Attorney, Agent, or Firm*—William E. Hilton; Robert A. Sabourin

(57) ABSTRACT

An imaging system is disclosed including a first illumination source for producing a first illumination field, a modulation system for modulating the first illumination field, and an optical imaging system for directing the modulated illumination field to an imaging surface along a first optical path. In accordance with an embodiment, the imaging system includes a second illumination source for producing a second illumination field, a first sub-assembly, a second sub-assembly and a control assembly. The first sub-assembly is for directing the second illumination field toward the imaging surface along a second optical path that is different than and non-parallel with said first optical path. The first sub-assembly includes a beam splitter sub-assembly that includes a beam splitter and at least one lens. The second sub-assembly is for receiving a portion of the second illumination field from the imaging surface, and includes a lens and a sensor for producing a sensor output signal. The control assembly is for adjusting a focal point of the optical imaging system responsive to the sensor output signal.

1 Claim, 12 Drawing Sheets

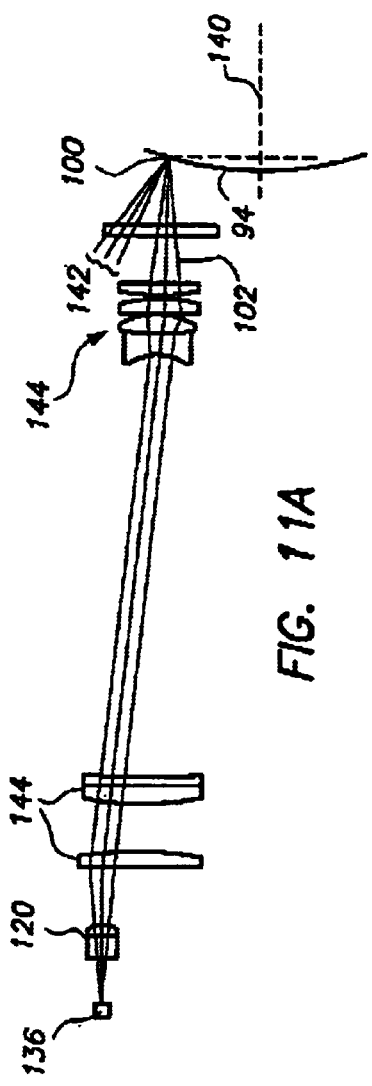
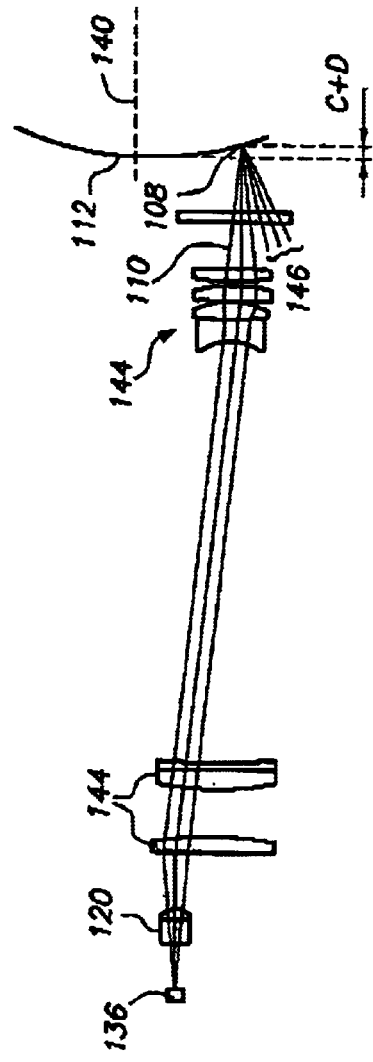
FIG. 11A
FIG. 11B

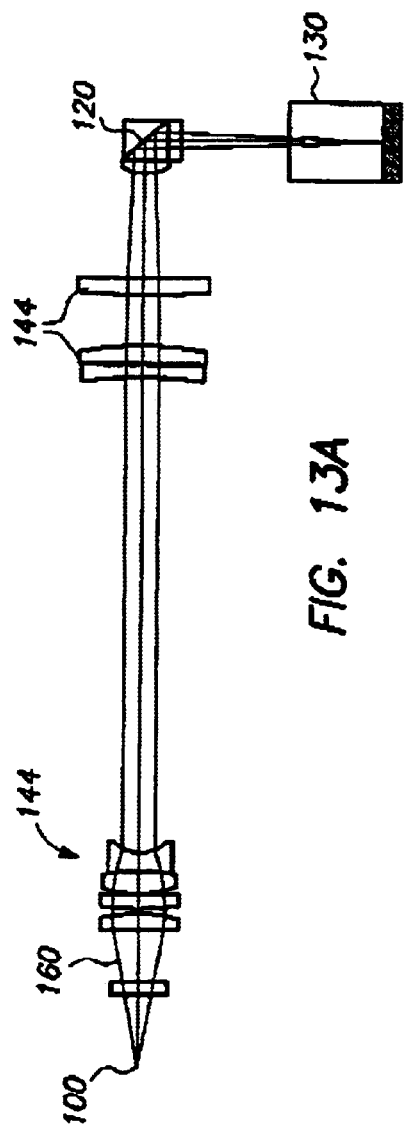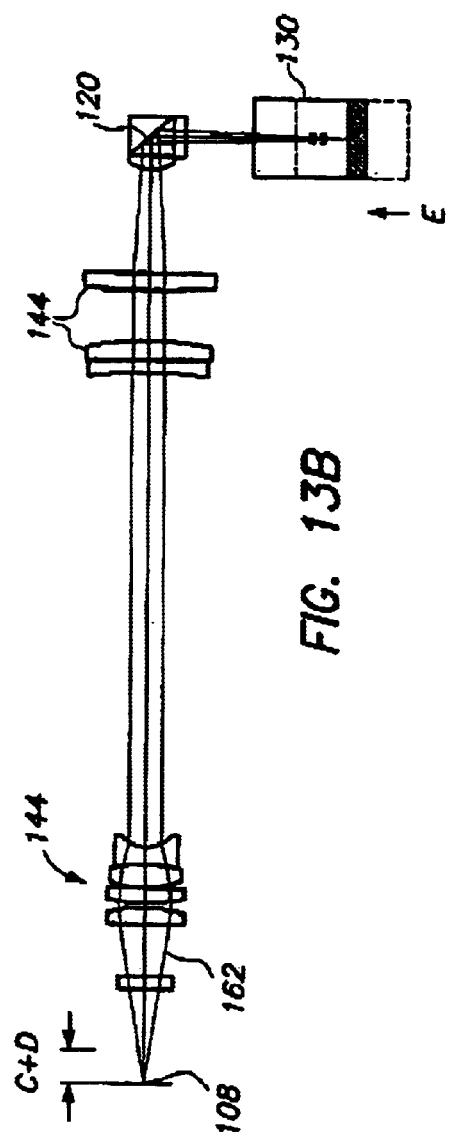
FIG. 13A
FIG. 13B

FOCUSING SYSTEM FOR USE IN IMAGING SYSTEMS

This application is a continuation-in-part application of U.S. patent application Ser. No. 09/712,860 filed Nov. 15, 2000 now U.S. Pat. No. 6,504,137.

BACKGROUND OF THE INVENTION

The invention relates generally to imaging systems, and particularly relates to imaging optics for use in relatively high power imaging systems.

Conventional imaging systems typically include a modulated illumination system for generating a modulated field of illumination, and an optical assembly for applying the modulated field of illumination to an imaging surface. Such illumination systems may provide a line of laser illumination so that a line of picture elements (or pixels) may be imaged at a time for efficiency in imaging. The field of illumination may be modulated by selectively controlling the illumination system (e.g., as disclosed in U.S. Pat. No. 4,804,975), or by using a light modulator for selectively modulating the field of illumination. Illumination systems that modulate the illumination field generally require that relatively high currents be switched on and off at fairly high speeds. The use of light modulators permits the illumination system to provide a relatively uniform field of illumination by permitting the laser emitters to exhibit relatively uniform power consumption and be maintained at a relatively uniform temperature.

Optical assemblies for applying the modulated field of illumination to an imaging surface generally include imaging optics that focus the modulated field of illumination on an imaging surface, such as a drum. Certain such optical assemblies further include automatic focusing apparatus. For example, U.S. Pat. No. 5,212,500 discloses an imaging system for a color proofing apparatus in which a secondary light source is generated that is projectable through the optical lens assembly onto the writing element. The secondary light source is then reflected off of the writing element and received at a photodetector. A movable lens element is then adjusted for automatic focusing of the optical assembly responsive to the signal generated by the photodetector. Because the system of the '500 patent is a color proofing apparatus involving dye sublimation, the power level of the primary light source for writing is relatively low, and images may be printed responsive to the reception of a small amount of light at the writing surface. Consequently, the secondary light source must be of a wavelength that is different than the wavelength of the primary light source to prevent the secondary light source from causing any images to be formed on the writing surface. Also, some undesired light (or noise), may be received by the photodetector. This is because any reflections of the secondary light off of the optical lenses in the optical assembly will be reflected back along the path of the secondary light toward the photodetector. Because the secondary light source produces a relatively small amount of light, any such reflections may adversely affect the automatic focusing assembly, particularly if the primary light source is relatively high power. Also, photodetectors that are responsive to power only, provide an indication of corrective distance but not corrective direction.

It is an object of the invention to provide an optical assembly that efficiently and accurately provides automatic focusing.

It is another object of the invention to provide an automatic focusing optical assembly for use in a high power imaging system.

It is another object of the invention to provide an automatic focusing optical assembly in a thermal imaging system for imaging thermally sensitive media.

It is another object of the invention to provide an automatic focusing optical assembly using a focusing sensor that is not responsive to power.

It is another object of the invention to provide an automatic focusing optical assembly with minimal undesired light (or noise) appearing at the focusing sensor.

It is another object of the invention to provide an automatic focusing optical assembly with a focusing sensor that provides an indication of the corrective direction as well as the corrective distance

SUMMARY OF THE INVENTION

In accordance with an embodiment, the invention provides an imaging system and method including a first illumination source for producing a first illumination field, a modulation system for modulating the first illumination field, and an optical imaging system for directing the modulated illumination field to an imaging surface. The optical imaging system includes a second illumination source for producing a second illumination field in an embodiment. The optical imaging system also includes a sensor assembly for receiving a diffuse reflection of the second illumination field after it is reflected off of a portion of the imaging surface, and for producing a sensor output signal. The optical imaging system also includes a control assembly for adjusting the position of at least one optical lens responsive to the sensor output signal. In accordance with further embodiments, the invention provides for the use of modular and independently moveable beam splitter and lens/quad cell sensors sub-assemblies, as well as the detection of diffuse (as opposed to specular) illumination from the second illumination field.

BRIEF DESCRIPTION OF THE DRAWINGS

The following description may be further understood with reference to the accompanying drawings in which:

FIGS. 11A and 11B show illustrative diagrammatic views of focusing illumination systems in accordance with certain embodiments of the invention;

FIGS. 13A and 13B show illustrative diagrammatic views of focusing detection systems in accordance with certain embodiments of the invention.

The drawings are shown for illustrative purposes only, and are not to scale.

DETAILED DESCRIPTION OF THE INVENTION

Figure 1:
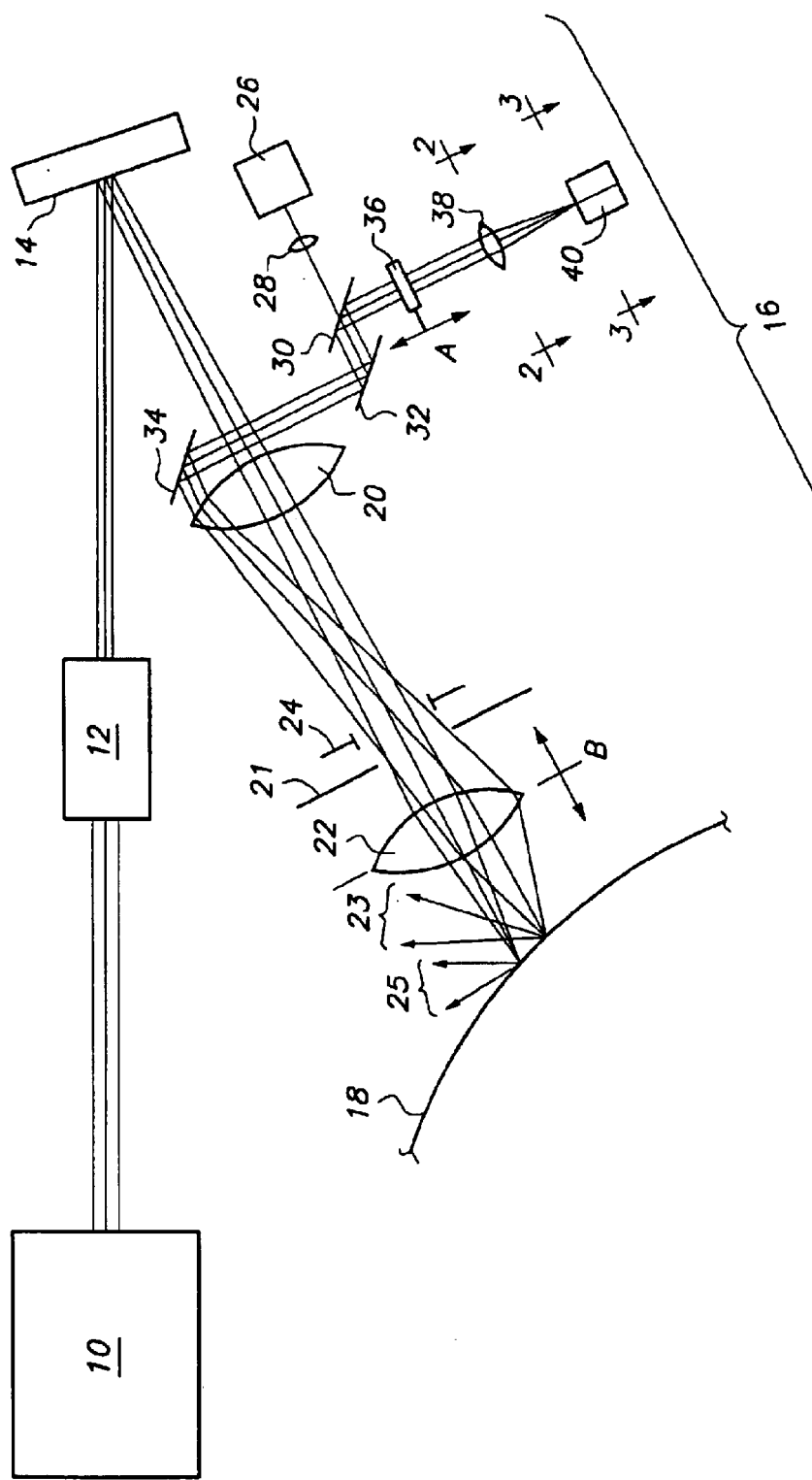
FIG. 1 shows an illustrative functional diagram of an imaging system including an optical assembly of the invention.

As shown in FIG. 1, an imaging system in accordance with an embodiment of the invention includes a relatively high power illumination source 10 such as an array of infra red (IR) laser emitters and associated optics, a field lens system 12 including one or more field lenses, a light modulator 14, an imaging optical assembly 16, and an imaging drum for supporting a thermally sensitive recording medium 18. Generally, the illumination field is selectively focused onto the thermal recording medium to produce a desired image. The recording medium includes a protective coating that prevents the film from being imaged when exposed to light. The light protected recording medium may be selectively thermally ablated at a threshold power level for imaging in accordance with thermal imaging techniques.

The illumination source 10 includes an array of laser diode emitters in a preferred embodiment that generate and emit a line of continuous wave energy. The light modulator 14 is reflective in a present embodiment, and comprises a reflective grating light valve (GLV). The zero order diffraction of the illumination field from the GLV is imaged onto the thermal recording medium by the imaging optics 16. The higher order diffraction images may be blocked by appropriate optical devices (not shown), and the imaging illumination field transfers the image from the GLV to the recording medium via the imaging optical assembly.

It has been discovered that an illumination field from a secondary light source (the focusing illumination field) may be economically and efficiently used in an automatic focusing assembly with the attendant production of a minimal amount of erroneous undesired signals. In particular, it has been discovered that if the focusing illumination field does not approach the optical lens elements from a direction that is normal (i.e., perpendicular) to the surface of the lenses, then any reflected light off of the lens surfaces will not be reflected back along the same path from which the focusing illumination came. Similarly, the focusing illumination field, as well as the imaging illumination field, may be designed to not approach the writing surface of the recording medium from a direction that is normal to the writing surface. If the focusing illumination field approaches the lens elements and the writing surface of the recording medium 18 from an off-axis direction, then undesired reflected signals 23 will not be coincident with the path of the focusing illumination, and therefore, will not reach the sensor in any substantial amount. Employing an off-axis imaging field also reduces the presence of undesired reflected signals 25 along the imaging illumination path. It has further been discovered that improved results are obtained by not placing any beam splitters in the path of the primary illumination field.

An off axis automatic focusing system in accordance with an embodiment of the invention is shown in FIG. 1. In the optical assembly 16 of FIG. 1, the imaging illumination field passes through the optical path of a pair of lenses 20 and 22, as well as a pupil 24 that is positioned between the lenses 20 and 22. Each of the lenses 20 and 22 includes a curved first surface through which the imaging illumination field passes. A focusing illumination field is produced by a secondary light source 26, and passes through a collimating lens 28 and a beam splitter 30. The focusing illumination field is then directed by mirrors 32 and 34 toward the outer edge of optical lens 20 from an off-axis direction. The lens 20 directs the focusing illumination field through the pupil 24 toward the outer edge of optical lens 22 from an off-axis direction. Any reflection of this focusing field by either lens 20 or 22, therefore, will not be directed back along the path from which the focusing illumination field came. An IR blocking spatial filter 21 may also be used to prevent any reflected light 23 that passes back through the lens 22 from traveling back toward the lens 20. The specular reflection of the focusing illumination field is directed away from the incident focusing illumination field as shown at 23 due to the off-axis approach of the focusing illumination field onto the writing surface.

Diffuse light from the focusing illumination field emanates from the imaging surface and a portion of the diffuse field is directed back toward the lens 22, the pupil 24 and the lens 20. The lenses capture a returned portion of the diffuse field that is directed by the mirrors 34 and 32 toward the beam splitter 30, where it is redirected toward a wavelength filter 36 (e.g., an IR blocking filter). The returned diffuse field may be wider than the original focusing field produced by the secondary light source 26 due to divergence as shown.

Figure 2:
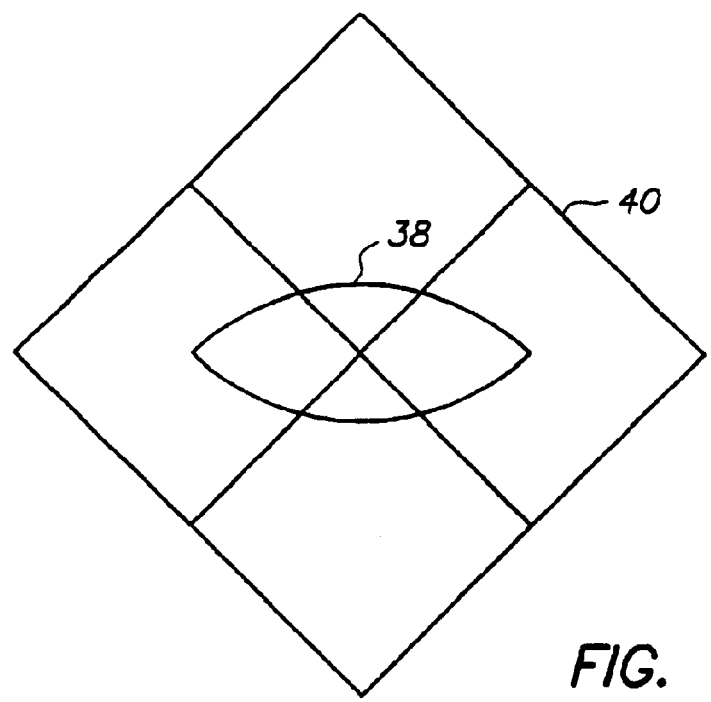
FIG. 2 shows an illustrative view of a portion of the system of FIG. 1 taken along line 2—2 thereof.

The wavelength filter 36 permits only light to pass through the filter 36 that has the predefined wavelength of the secondary illumination source 26. The returned diffuse focusing illumination field is then passed through a cylindrical lens 38, and is received at a quad cell receiver 40. The cylindrical lens 38 introduces an astigmatism that transforms a round spot into two orthogonal ellipses. The quad cell receiver is positioned at a 45 degree rotation with respect to the axis of the astigmatic lens as shown in FIG. 2. The quad cell receiver 40 is responsive to the phase of the returned diffuse focusing illumination field. Because of this, the system may determine the direction as well as the distance that the movable focusing lens must move to achieve automated focusing.

Figure 3:
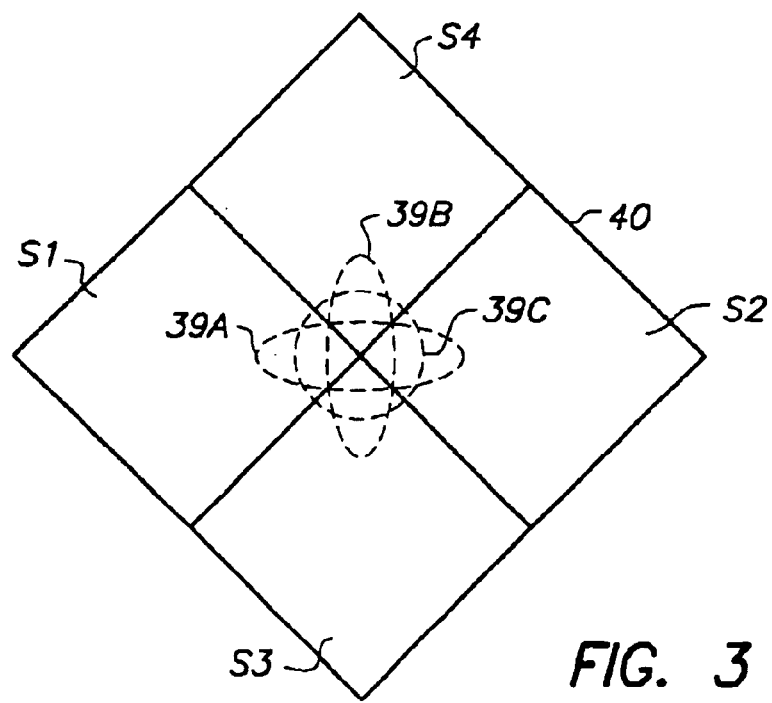
FIG. 3 shows an illustrative view of a portion of the system of FIG. 1 taken along line 3—3 thereof.

During use, the shape of the returned diffuse focusing field at the sensor 40 will vary with the position of the lens 22 as shown at "A". The shape of the reflected focus field as received by the sensors $S_1$, $S_2$, $S_3$ and $S_4$ of the quad cell receiver 40 is shown in FIG. 3. This shape changes as indicated at 39A–39C as the focal distance of the imaging system changes, and in particular, changes in different ways depending on whether the focal distance needs to be corrected by moving the focal lens toward or away from the imaging medium. For example, the image 39A may indicate that the focal lens needs to be moved toward the medium; the image 39B may indicate that the focal lens needs to be moved away from the medium; and the image 39C may indicate that the system is in focus.

Figure 4:
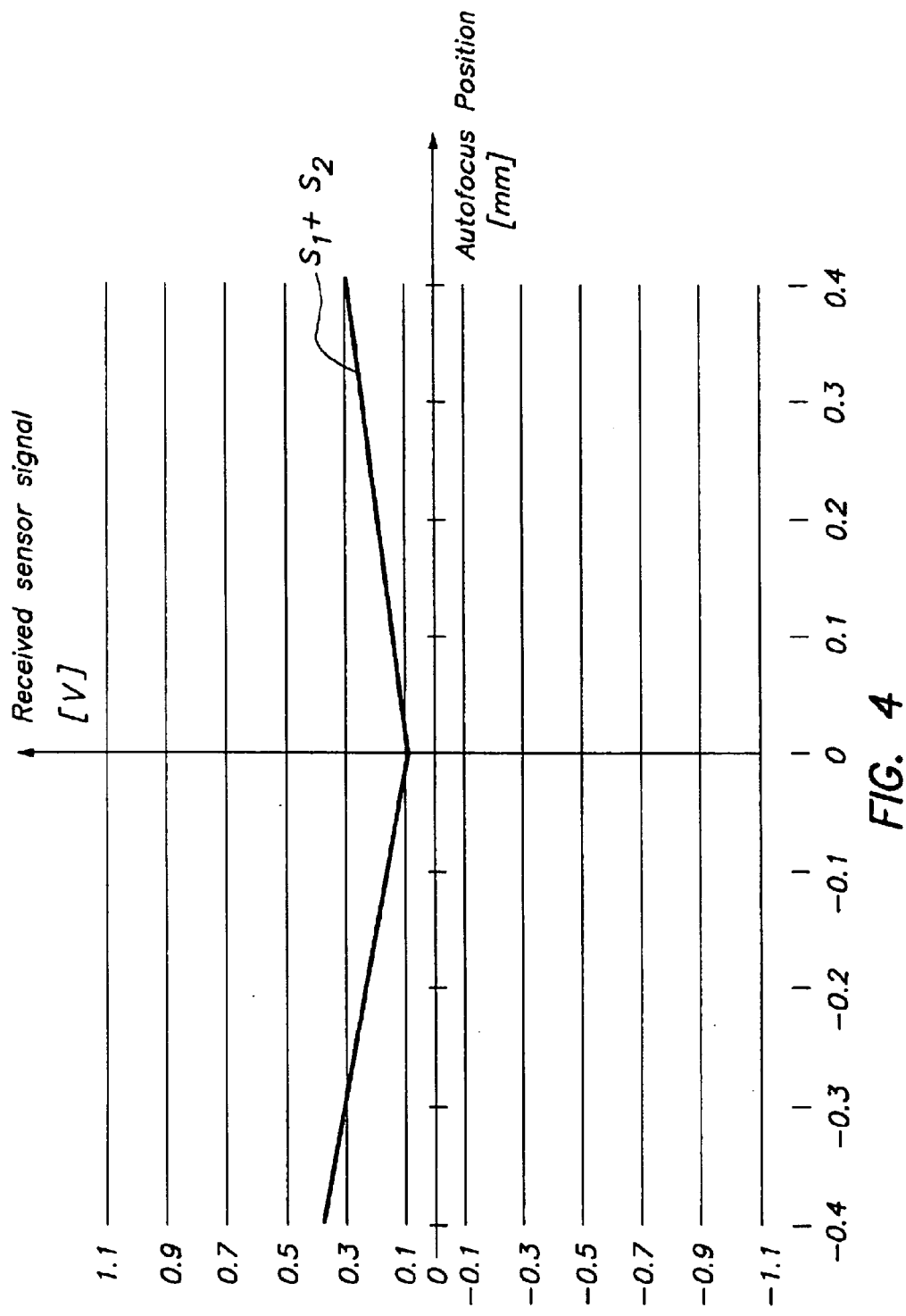
FIGS. 4–6 show illustrative graphical representations of the performance of a sensor in accordance with an embodiment of the invention.
Figure 5:
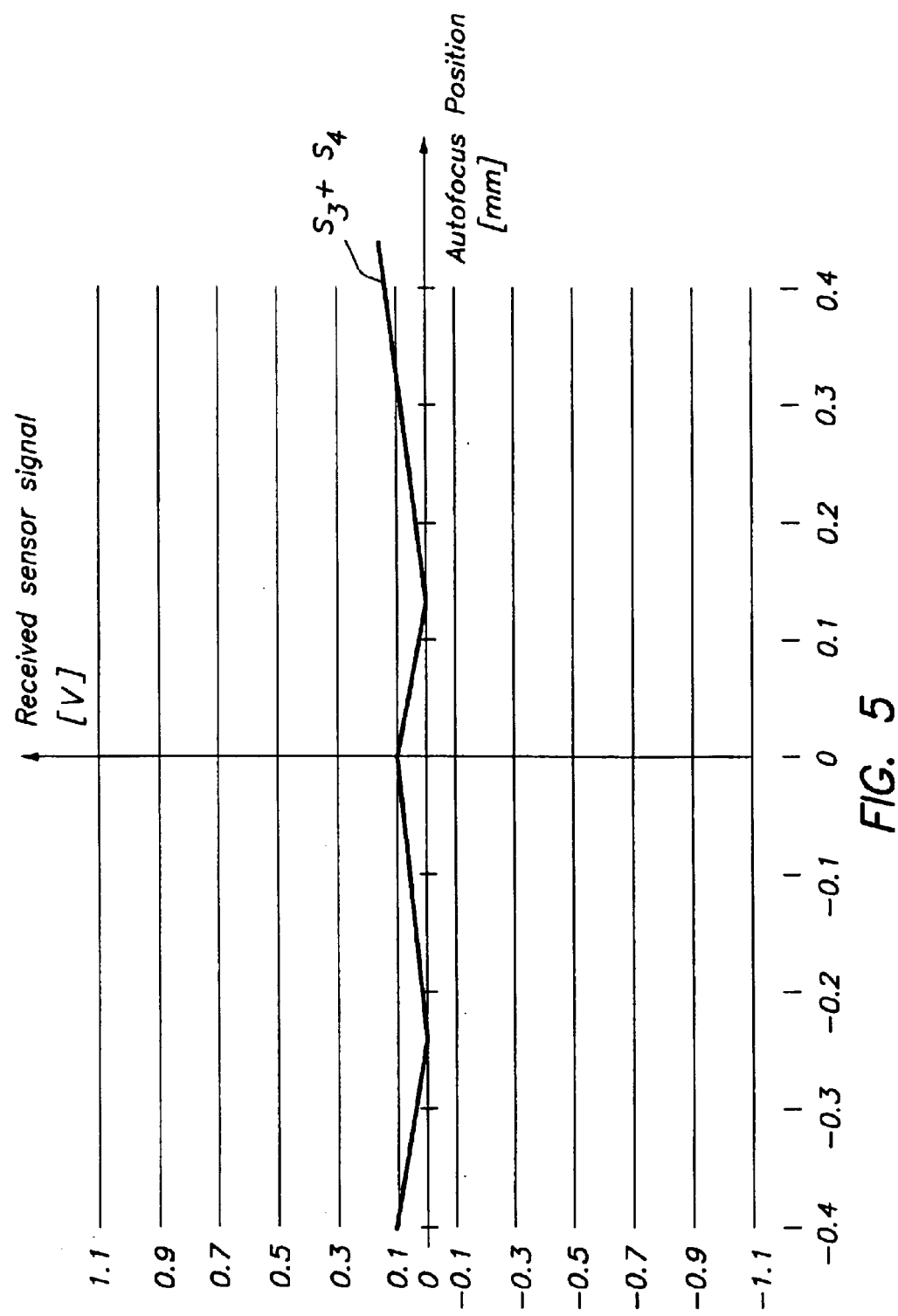

Specifically, the system combines the four sensor output signals in accordance with a particular algorithm. FIG. 4 shows the received sensor signal (in volts) vs. the autofocus position (in millimeters) for the sum of sensor output signals $S_1$ and $S_2$. FIG. 5 shows the received sensor signal vs. the autofocus position for the sum of sensor output signals $S_3$ and $S_4$. The system determines a quad cell receiver output signal $S_O$ such that $S_O=[(S_1+S_2)-(S_3+S_4)]/[S_1+S_2+S_3+S_4]$. The quad-cell is positioned in a z direction exactly between the two ellipses (39A and 39B), where the cross-section of the light cone hitting the quad-cell is circular (39C). By exactly centering the quad-cell also in the x and y directions, each quadrant will receive the same amount of light (balanced detector) and the output of the quad-cell according to the algorithm will be zero. If the drum was out of focus, the quad cell would be illuminated by an ellipse that would result in unbalanced quadrants and lead to an output signal of greater than or less than zero. A controller would then generate a voltage to move a lens inside the imager to bring the focus back onto the drum surface. The normalized output (S) of the quad-cell detector and will range from −1 (e.g. horizontal ellipse) to −1 (e.g. vertical ellipse). The graphical S-curve provides the relationship between drum defocus and the normalized quad-cell signal S-shaped and ranges from −1 to +1 crossing zero when the drum is in focus.

Figure 6:
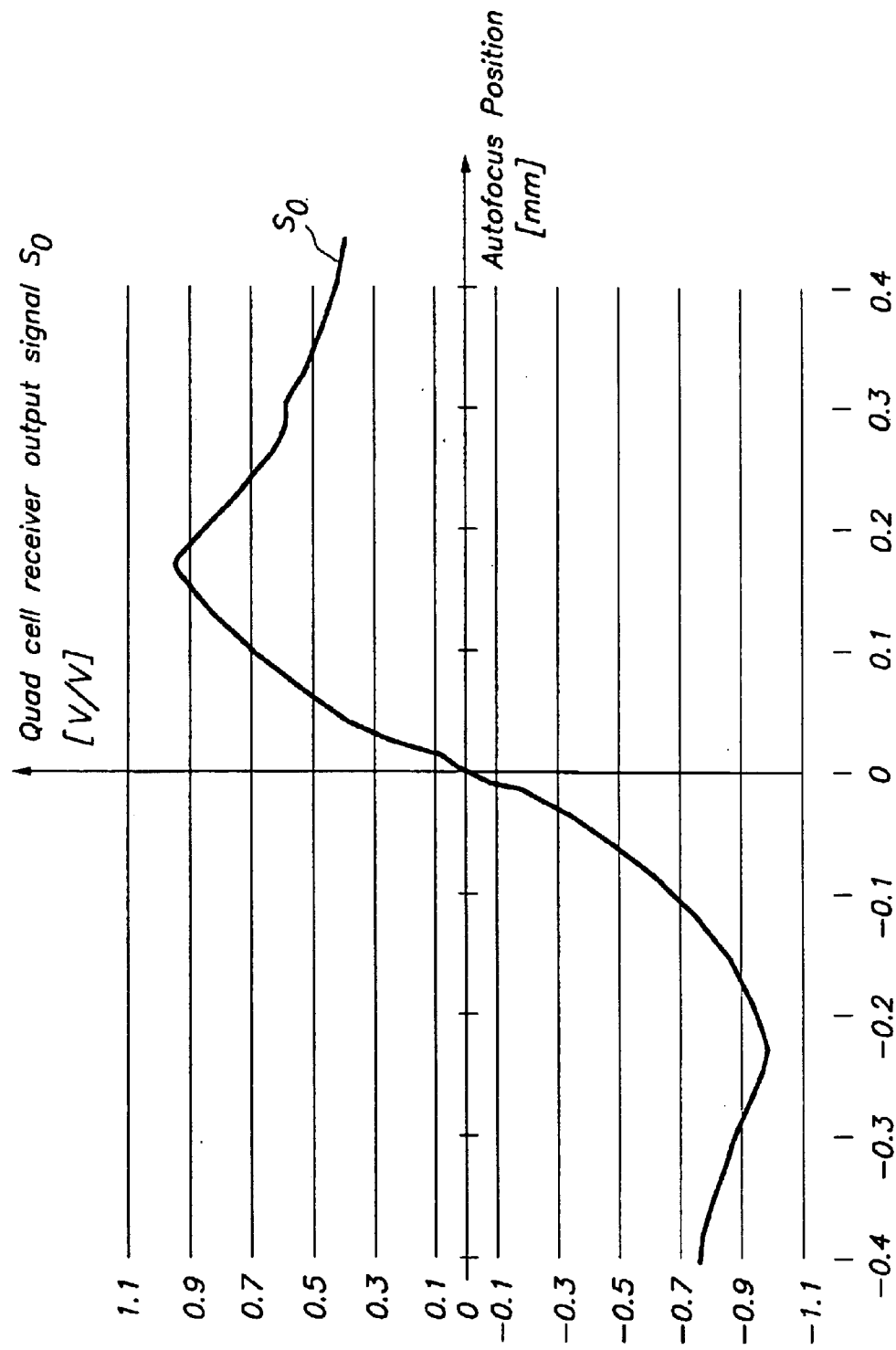

For example, FIG. 6 shows the received sensor signal vs. the autofocus position for the output signal $S_O$. An important requirement for the S-curve is that it shows a reasonable amount of linearity for a specific range of defocus. In order to be certain that the autofocus beam contacts the imaging surface at an unexposed region of the surface, the geometry should be chosen so that the autofocus beam contacts the imaging plate before the imaging beam contacts the imaging plate. Taking into account the spin direction of the drum, this is accomplished by positioning the autofocus beam so that it contacts the drum below the imaging beam. Based on drum rotation speed, response time of the closed loop system etc., a spatial separation between the imaging and autofocus beams on the drum about 2 mm in height (y-dimension) is therefore reasonable. The head is installed so that the imaging field focus is exactly on the drum surface. Because of the curved drum surface, the offset in height with regard to the drum equator between the imaging and autofocus beams also leads to an axial shift in the z direction between the imaging and autofocus beams.

The optical lens 20 is a collimating lens, which provides that the imaging system exhibits telecentricity. Telecentricity occurs when rays are normal to an incident surface. The benefit of having an imaging system with dual telecentricity is to separate diffractive orders and separate magnification adjustments from focusing adjustments. With a dual telecentric arrangement, magnification of the system is insensitive to movements of the light modulator 14, either lens 20 or 22, or imaging medium 18. Either magnification or focus, therefore, may be adjusted independent of one another. For example, adjusting the position of lens 22 as shown at "B" in FIG. 1 will result in a change of the focal plane of the imaging system, but not the magnification.

Because the focusing illumination field is off-axis with respect to the imaging illumination field, the amount of undesired reflection of the focusing illumination field (e.g., from the lenses and writing surface) that is received by the sensor is minimized. Moreover, because the thermally sensitive medium records images when the power of the imaging field exceeds a threshold only, unwanted images are unlikely to be recorded on the media. For these reasons, the focusing illumination field may have a wavelength that is the same as the wavelength of the imaging illumination field in an embodiment of the invention.

Figure 7:
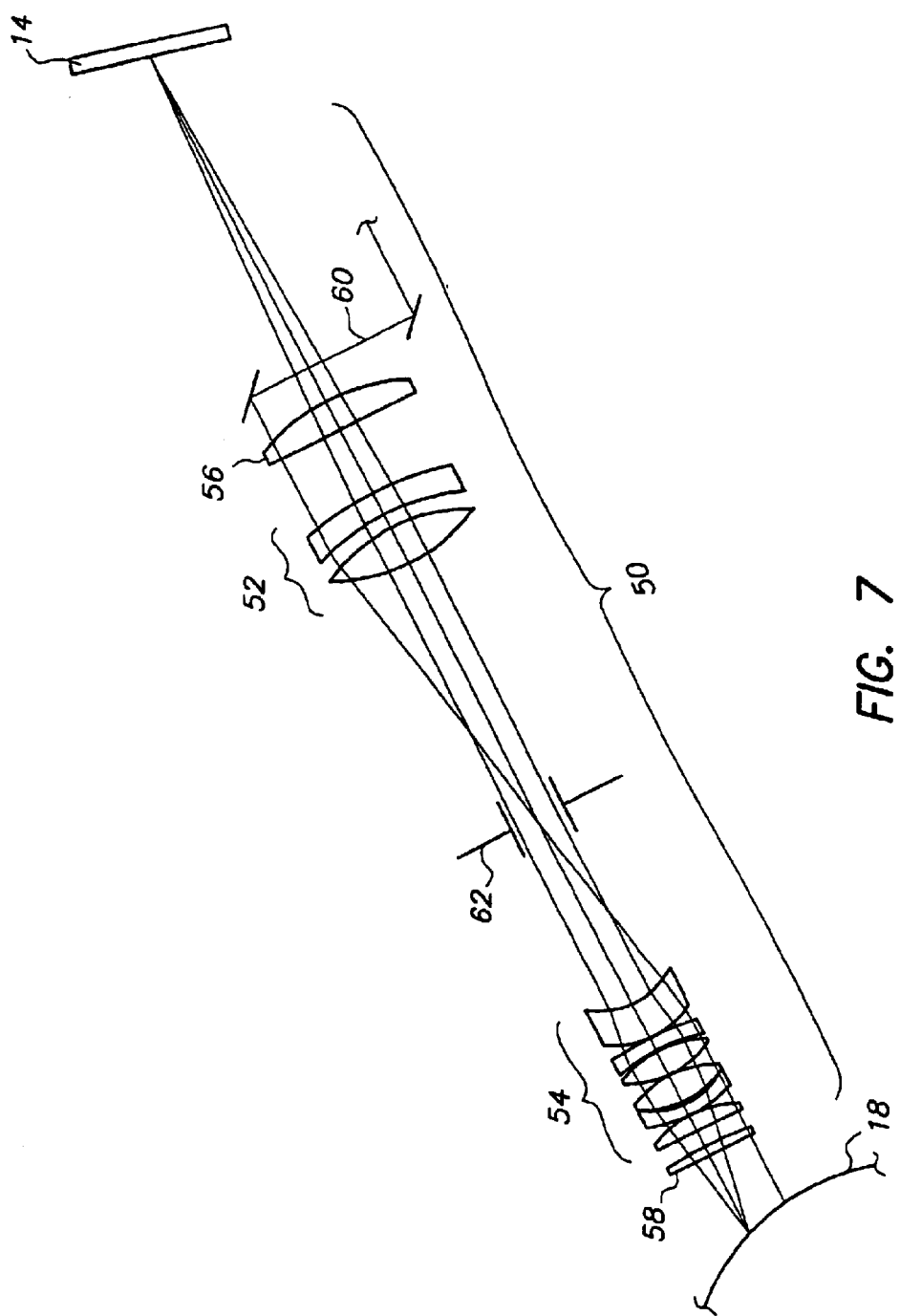
FIG. 7 shows an illustrative functional diagram of an optical imaging system in accordance with another embodiment of the invention.

In further embodiments, the optical lenses 20 and 22 may each comprise an assembly of lenses. For example, as shown in FIG. 7, in accordance with another embodiment of the invention, an optical imaging system 50 may include movable lens assemblies 52 and/or 54, as well as fixed or movable lenses 56 and 58. Lens assembly 52 is a collimating lens assembly, permitting either of lens assembly 52 or 54 to be moved responsive to the output of a sensor as discussed above. A focusing illumination field may by generated by a second illumination source as discussed above, and directed toward the imaging medium 18 along an off-axis optical path 60, which passes through pupil 62.

Figure 8:
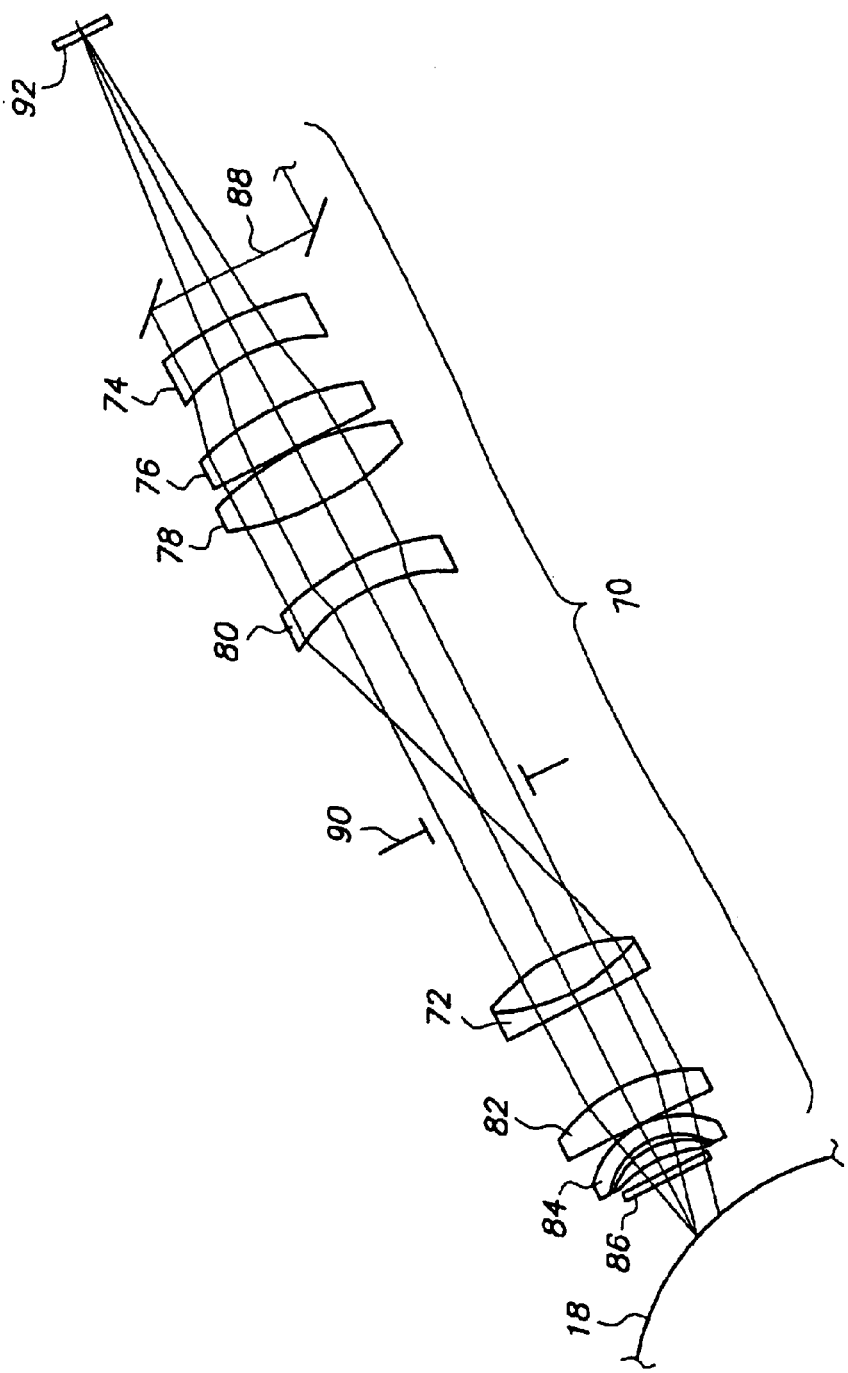
FIG. 8 shows an illustrative functional diagram of another optical imaging system in accordance with a further embodiment of the invention.

As shown in FIG. 8, in a further embodiment of the invention, an optical imaging system 70 may include movable lens assembly 72, as well as fixed or movable lenses 74–86. Lens assembly 80 is a collimating lens assembly, permitting either of lens assemblies 72 and/or 80 to be moved responsive to the output of a sensor as discussed above. A focusing illumination field may by generated by a second illumination source as discussed above, and directed toward the imaging medium 18 along an off-axis optical path 88, which passes through pupil 90. In the embodiment shown in FIG. 8, the imaging illumination field is provided to the optical system 70 via a bundle of fiber optic cables 92, the illumination from one of which is shown for illustrative purposes.

Figure 9A:
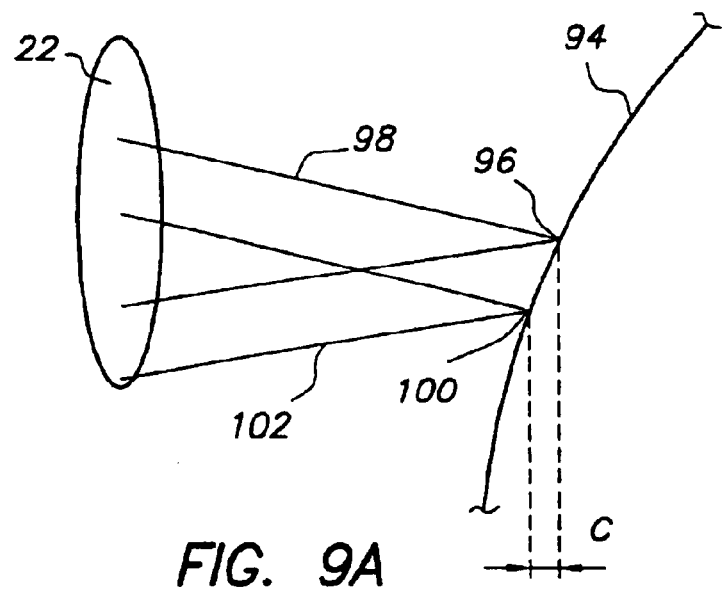
FIGS. 9A and 9B show illustrative diagrammatic views of imaging systems in which focusing systems of the invention may be employed.
Figure 9B:
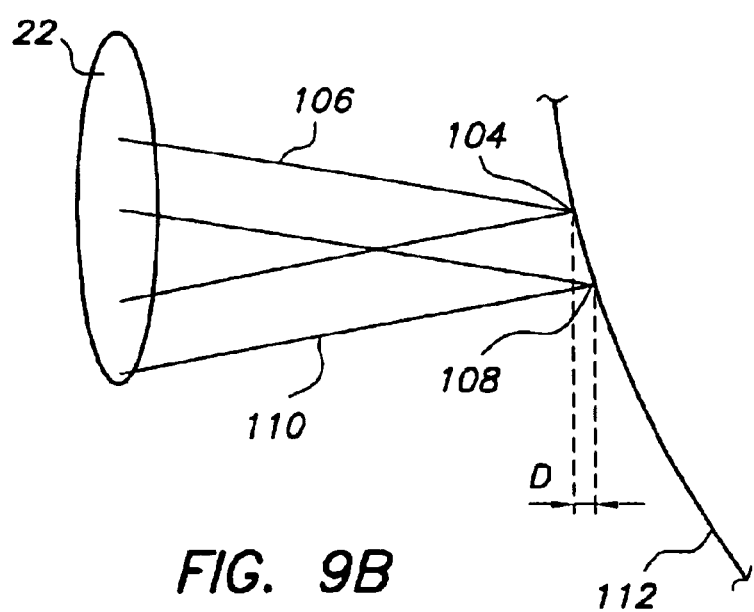

In an embodiment of an imaging system employing an autofocus system of the invention, the position of the imaging head with respect to the writing surface 94 may provide an offset C in the z direction as shown in FIG. 9A between the focal point 96 of the imaging field 98 and the focal point 100 of the autofocus field 102. The offset C may, for example, be −0.48 mm. In accordance with another embodiment of an imaging system employing an autofocus system of the invention, it may be desirable to employ an imaging head that is located in a different height with regard to the drum center line than for the previously described system. As shown in FIG. 9B, such a system may employ a focal point 104 of an imaging field 106 that is offset from the focal point 108 of the autofocus field 110 on an imaging surface 112 by an offset of D, which may be for example, 0.41 mm.

When switching, therefore, between the two imaging systems, the autofocus system would be required to accommodate a variable offset of C–D, e.g., about 0.9 mm. This 0.9 mm axial focus shift will be magnified 25 times (longitudinal magnification of the relay optics) in the z direction by the autofocus relay optics and as a consequence no useful signal will be produced by the quad cell detector. The reason for this is that the two ellipses and the useful symmetrical round spot between them will be shifted by a total about 0.99 mm×25=22 mm closer to the cylindrical lens. If the quad-cell position from the first imaging system is employed in the second imaging system, then the quad-cell will receive a highly blurred ellipse and will not be sensitive to drum run-out because the shape of the cone illuminating the quad-cell won't change significantly with drum run-out.

In certain situations it is desirable to employ the same autofocus system in different imaging systems, but unfortunately it may not be possible or desirable to move either the quad-cell or the cylindrical lens. Moving only the quad-cell by about 22 mm closer towards the cylindrical lens into the range where the two orthogonal ellipses show up does not solve the problem because (1) the ellipses become too small so that a balancing of the quad-cell by alignment becomes very difficult or impossible; (2) the z direction range between the two orthogonal ellipses becomes too small (very compressed S-curve, too steep slope) and may not permit a proper working closed loop system; and (3) the linearity requirements for the "S-curve" as described above are not fulfilled.

Figure 10:
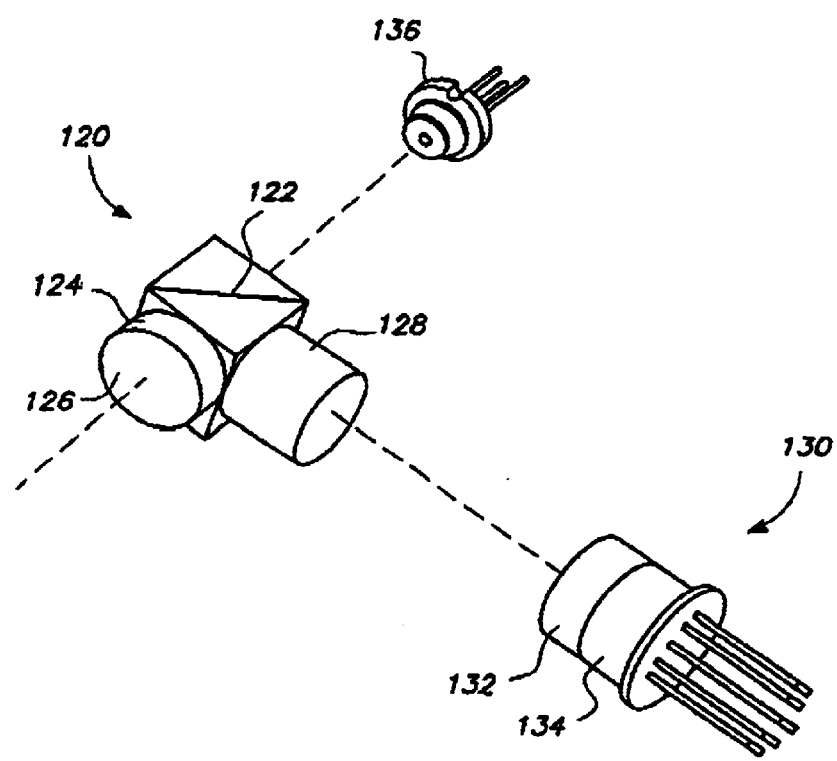
FIG. 10 shows an illustrative diagrammatic view of an optical assembly for a focusing illumination system in accordance with an embodiment of the invention.

In accordance with a further embodiment of the invention, an autofocus module system as shown in FIG. 10 may be employed. The module system permits the same electronics (e.g., laser driver) and detection mechanism (e.g., quad cell) to be used as in different imaging systems, and the S-curve for both systems should be the same in terms of slope and linearity range, permitting the systems to be interchangeable. The autofocus module system includes a first sub-assembly 120 including a beam splitter cube 122, a plano-convex lens 124 with an IR blocking filter 126 on its outer surface, and a plano-concave lens 128 as shown in FIG. 10. The autofocus module system also includes a second sub-assembly 130 that includes a cylindrical lens 132 that is cemented to a quad-cell detector 134 as shown in FIG. 10. A light source 136 (optionally including a lens) provides the focusing illumination field that is directed toward the first sub-assembly 120. The cylindrical lens 132 will introduce the astigmatism in the optical detection path as discussed above in connection with previous embodiments of the invention. Again the change between two orthogonal ellipses may be detected by the quad-cell and the S-curve may be generated using the mathematical algorithm discussed above.

The use of the two sub-assemblies permits the autofocus system to be compact as well as versatile in being suitable for use in a variety of imaging systems. In the present embodiment, the module system includes a cemented beam splitter sub-assembly and a cylindrical lens/quad cell assembly. In order to make these sub-assemblies fit into imaging heads of various systems, a beam compressor may be used to shorten the working distance. The beam-compressor comprises a positive and a negative lens element and is realized by cementing those two lenses together with the necessary beam-splitter that separates the illumination from the detection path. This cementing makes the module very compact and insensitive for alignment errors. No mirrors are necessary to fold the beam, making the alignment much easier and less sensitive to tolerances.

The use of an IR coating 126 on the first surface of the cemented beam-splitter sub assembly 120 instead of using a separate optical element like an IR blocking filter provides that the module is more compact, cheaper and less sensitive to alignment because one complete part is avoided. Also, the IR coating on this surface not only protects the quad-cell from harmful light that is scattered back from the drum but also protects the autofocus illumination diode.

An autofocus system of the invention may also provide a simplified autofocus illumination path that is decoupled from the autofocus detection path. The autofocus illumination path is very direct and does not require that a mirror be used to couple the autofocus light into the optical relay system as shown in FIGS. 11A and 11B. The new system also does not require the use of a collimating lens and the need for an intermediate focus, which makes alignment much easier and less sensitive to tolerance. Moreover, the module is less expensive to produce, in part, because it includes fewer optical elements.

In particular, in accordance with an embodiment of an imaging system employing an autofocus system of the invention, the focal point 100 of the autofocus illumination field 102 may lie on the imaging surface 94 above the drum center line 140 of the imaging drum as shown in FIG. 11A. The specular reflected autofocus illumination field is directed away from the autofocus illumination path upon reflection from the drum as shown at 142. The imaging and autofocus fields are parallel to the horizontal drum center line. The system also includes imaging field relay optics 144 similar to those discussed above. As shown in FIG. 11B, an imaging system employing an autofocus system in accordance with a further embodiment of the invention provides that the focal point 108 of the autofocus illumination field 110 lies on the imaging surface 112 below the drum center line 140 of the imaging drum. Again the specular reflected autofocus illumination field is directed away from the autofocus illumination path upon reflection from the drum as shown at 146.

There is no specular reflected light 142, 146 reflected back toward the autofocus detection path in either of the systems shown in FIGS. 11A and 11B because the autofocus illumination beam contacts the drum in both cases far above or below the drum center line. Because of the steep angle of incidence, the directly reflected light cannot be collected by the numerical aperture of the relay optics. The light, therefore, that is collected by the relay optics and focused onto the quad cell consists of purely scattered light (diffused reflected light) from the drum surface. The spot that is generated in the drum may be considered an independent light source that emits light as a Lambertian source. This makes the alignment of the autofocus system much more reliable because the color of the plate that will be exposed does not matter. The ratio between reflected and scattered light changes with plate color and may affect the S-curve.

Figure 12A:
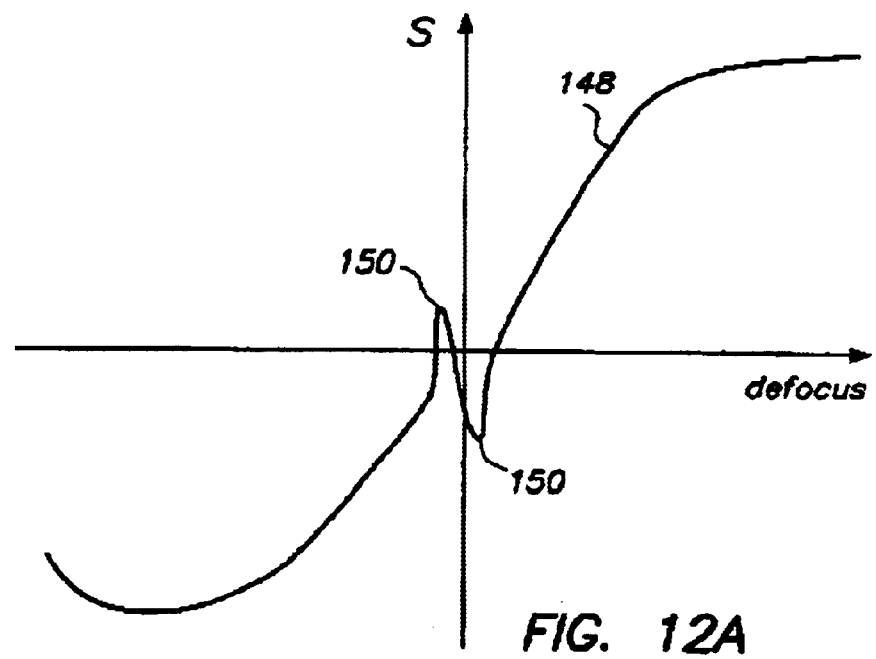
FIGS. 12A and 12B show illustrative graphical representations of performance response curves of focusing illumination and detection systems in accordance with certain embodiments of the invention.

Speckles typically represent an obstacle in illumination systems design. Speckle is an undesirable side effect that limits the signal to noise ratio on a detector, and is produced by an interference that occurs when coherent light is reflected by a rough surface (rough at least on the scale of wavelength of light). The interference pattern shows up on the quad cell and moves arbitrarily over the detector when the drum moves through focus. The contribution of this signal may be so high that it can completely destroy the performance of the system. Since the speckles show up when the red illumination laser is in focus, they may show up, for example, in the S-curve 148 as kings 150 as shown in FIG. 12A exactly in the region of the steepest slope and linear range, where the tracking point of the closed loop system should be located. A tracking is therefore impossible in this region.

Figure 12B:
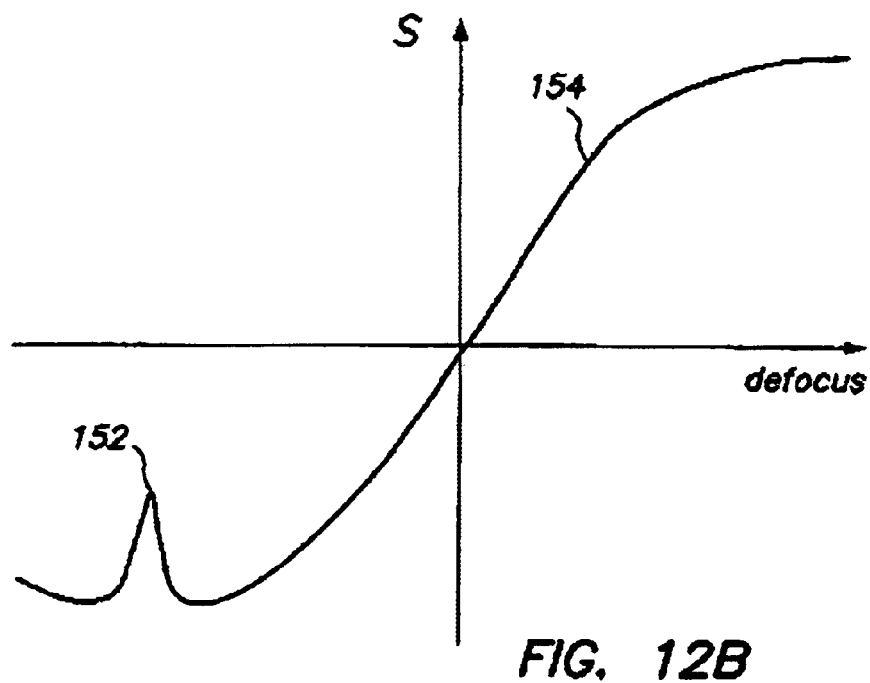

A possible solution to this problem is to defocus the illumination spot on the drum. This destroys the spatial coherence of the light when it is diffusely scattered back. Relaying that increased spot size from the drum onto the quad cell will lead to a blur of the eclipses on the quad cell and result in a drop of performance (S-curve slope). But this effect may be taken into account when the autofocus optics is designed by adjusting the spot size to, for example, 30–50 microns. The defocusing of the illumination laser in order to move the speckles 152 from the linear slope range of the S-curve 154 (tracking point area) into an area where they are harmless may be a final alignment step in setting up an autofocus system as shown in FIG. 12B. In certain autofocus systems it may be difficult to defocus the illumination laser after the modular is aligned since the collimating lens would have to be moved to achieve the defocusing. Because of the high demagnification ratio of 1:25 in the illumination path (as in the detection path for the previous module) a large movement of the collimating lens may be necessary to achieve a macroscopic change in spot size, possibly running out of travel.

An autofocus system in accordance with an embodiment of the invention permits defocusing of the illumination spot on the drum by simply moving the laser diode in the z-direction. The reason for this is that the illumination path and the detection path are decoupled by the cemented beam-splitter cube assembly. The illumination and the detection path only share the plano-convex lens and the beam-splitter cube, but not the plano-concave lens that is part of the detection path only. As a consequence there exists two different magnification ratios, one for the illumination path and one for the detection path. The longitudinal magnification ratio in the new illumination path is 1:1 and guarantees that the spot size will change in a reasonable manner when moving the laser diode, whereas the high magnification of 25:1 in the detection path is still maintained in order to achieve the necessary detection sensitivity (S-curve slope).

In accordance with an embodiment of the invention, therefore, the autofocus system of the invention may provide that the sub-assembly that compromises the cylindrical lens and the quad cell may be moved separately in the z direction. As a result, when switching between imaging systems, only the changes in alignment that have to be made are the following changes in the illumination path and the changes in the detection path. In the illumination path, the laser diode has been moved in the z direction by about 0.9 mm, in order to move the focus on the drum that is further away in one imaging system than the other by about 0.9 mm (1:1 magnification ratio in the illumination path).

As shown in FIGS. 13A and 13B the cylindrical lens and quad cell sub-assembly in an autofocus detection system maybe moved, e.g., by a distance as shown at E in FIG. 13B, to permit the autofocus system to be used in different imaging systems. In particular, the detection system shown in FIG. 13A receives the returned portion of diffuse light 160 from the focal point 100, and transmits the received light to the lens and quad cell sub-assembly 130 via relay optics 144 and the beam splitter sub-assembly 120. The detection system shown in FIG. 13B receives the returned portion of diffuse light 162 from the focal point 108, and transmits the received light to the lens and quad cell sub-assembly 130 via relay optics 144 and the beam splitter sub-assembly 120. To accommodate the different imaging systems, the lens and quad cell sub-assembly 120 maybe moved a distance E as shown in FIG. 13B with respect to it position in relation to the beam splitter sub-assembly as shown in FIG. 13A. In the detection path, therefore, the sub-assembly compromising the cylindrical lens and the quad cell has to be moved in the z-direction by, for example, about 14 mm (taking into account the contribution of the beam-compressor demagnification) in order to compensate for the focus shift in the quad cell as a result of the drum shift of 0.9 mm. This is arrangement leads to the same ellipse size and distance for both imaging systems.

An optical imaging system of the invention is preferably used with an external drum imagesetter or platesetter, so that the image is transferred onto a medium supported by the external surface of the drum. An imaging system of the invention could also be used in direct-to-press imaging to project the line of illumination directly onto a plate cylinder of a printing press. In this case, the imaging system would be replicated at each station of the printing press. Furthermore, while the head is most appropriately used in the above-described applications, it may also be used in an internal drum or capstan style imagesetter or platesetter.

Those skilled in the art will appreciate that numerous modifications and variations may be made to the above disclosed embodiments without departing from the spirit and scope of the present invention.

What is claimed is:

1. An imaging system for automatically focusing an image for recordation onto an illumination surface, the system comprising:

a first illumination source for producing a first illumination field; a diffractive modulator for modulating the first illumination field received from the first illumination source; a first collimating lens for collimating the first illumination field received from the diffractive modulator; a pupil for passing the first illumination field from the first collimating lens; a first IR blocking filter for shielding the first collimating lens from light reflected from the imaging surface; a focal lens for focusing light received from the pupil onto the imaging surface; and an autofocus system comprising:
    a second illumination source for producing a second illumination field:
    a second collimating lens for collimating the second illumination field received from the second illumination source;
    a beam splitter and mirrors for directing the second illumination field from the second collimating lens through the first collimating lens, the pupil and the focal lens to the imaging surface, a portion of the second illumination field being reflected from the imaging surface and passing through the focal lens, the pupil and the first collimating lens;
    a second IR blocking filter for filtering the reflected portion of the second illumination field;
a cylindrical lens for receiving the reflected portion from the second IR blocking filter and introducing an astigmatism that transforms a round spot into two orthogonal ellipses;
    a quad cell sensor for receiving the reflected portion from the cylindrical lens to produce a sensor output signal; and
a control assembly for adjusting a focal point of the optical imaging system responsive to said sensor output signal.

* * * * *